United States Patent
Knobloch

(10) Patent No.: US 8,668,173 B2
(45) Date of Patent: Mar. 11, 2014

(54) APPARATUS FOR RETAINING FLUID HOSES TO A FARM IMPLEMENT FRAME

(75) Inventor: Dean A. Knobloch, Goodfield, IL (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 13/242,207

(22) Filed: Sep. 23, 2011

(65) Prior Publication Data

US 2013/0025516 A1   Jan. 31, 2013

Related U.S. Application Data

(60) Provisional application No. 61/512,286, filed on Jul. 27, 2011.

(51) Int. Cl.
*F16L 3/22* (2006.01)
(52) U.S. Cl.
USPC .............................. 248/68.1; 248/75; 248/90
(58) Field of Classification Search
USPC ......... 111/118–129; 248/75, 79, 89, 90, 68.1, 248/74.1; 239/1; 294/165
See application file for complete search history.

(56) References Cited

U.S. PATENT DOCUMENTS

| | | | |
|---|---|---|---|
| 2,361,943 A * | 11/1944 | Issoglio et al. ................ | 174/135 |
| 2,619,888 A * | 12/1952 | Young et al. .................. | 280/421 |
| 2,879,020 A | 3/1959 | Wheeler | |
| 3,696,880 A | 10/1972 | Bobard | |
| 3,882,886 A | 5/1975 | Ely et al. | |
| 4,111,268 A | 9/1978 | Frisbee | |
| 4,234,012 A | 11/1980 | Schupback | |
| 4,244,544 A * | 1/1981 | Kornat ......................... | 248/68.1 |
| 4,445,445 A | 5/1984 | Sterrett | |
| 4,557,448 A | 12/1985 | Brown et al. | |
| 4,572,302 A | 2/1986 | Frisbee | |
| 4,658,854 A | 4/1987 | Hopkins et al. | |
| 4,775,286 A | 10/1988 | Gillette et al. | |
| 5,082,217 A | 1/1992 | Parker et al. | |
| 5,598,795 A * | 2/1997 | House .......................... | 111/186 |
| 5,957,475 A * | 9/1999 | Pearen et al. ................. | 280/409 |
| 6,752,360 B2 | 6/2004 | Bennett | |
| 7,017,676 B2 | 3/2006 | Neufeld et al. | |
| 7,143,839 B2 | 12/2006 | Neufeld et al. | |
| 7,182,146 B2 | 2/2007 | Erickson et al. | |
| 7,478,783 B2 | 1/2009 | Royer | |
| 7,677,506 B1 | 3/2010 | Hammer | |
| 2010/0032531 A1 | 2/2010 | Getts | |

* cited by examiner

Primary Examiner — Alicia Torres
(74) Attorney, Agent, or Firm — Rebecca L. Henkel

(57) ABSTRACT

A bracket arrangement for securing fertilizer hoses, such as those for carrying anhydrous ammonia, to the frame of a fertilizer applicator or similar implement is made of a corrosion resistant material and is thus resistant to damage caused by thermal changes, sunlight, and inclement weather. The bracket arrangement is designed to be removably attached to the implement frame to allow flexibility in where along the frame the hoses, or bundles of hoses, are retained. The bracket arrangement includes a bracket having an elongated and generally planar body with an eyelet formed in the planar body. The eyelet is configured to pass a length of hose and restrict movement of the hose in a direction orthogonal to its length.

12 Claims, 4 Drawing Sheets

APPARATUS FOR RETAINING FLUID HOSES TO A FARM IMPLEMENT FRAME

CROSS-REFERENCE TO RELATED APPLICATION

The application claims the benefit of U.S. Ser. No. 61/512,286, filed Jul. 27, 2011.

BACKGROUND OF THE INVENTION

The present invention relates generally to farm implements and, more particularly, to an apparatus for retaining fluid hoses to the frame of a farm implement.

Pre-plant fertilizer implements, such as the Case New Holland Nutri-Placer 940, are designed to apply fertilizer and specifically anhydrous ammonia during seed bed preparation. The fertilizer implement generally consists of a tool bar or main frame that can be hitched to a tractor or other towing vehicle. Working tools, or combinations of working tools, such as shanks, coulters, knives, banders, and the like, can be mounted to the main frame and are designed to manage crop residue, improve soil tilth, and band plant food in the root zone. As the working tools are pulled through the soil, fertilizer, such as anhydrous ammonia, is routed from a tank hitched to the trailing end of the implement to fertilizer outlets integrally formed or mounted adjacent the working tools.

Farming practices continue to demand larger ("wider") implements to reduce the time needed to cultivate or prepare or plant a seedbed. This is also true of fertilizer applicators or implements. For instance, it is not uncommon for a fertilizer implement to have more than twenty working tools. The aforementioned Nutri-Placer 940, for example, can be fitted to have more than fifty shanks on fifteen inch centers across its sixty-five foot frame. A fertilizer hose is typically routed to each working tool and to ensure fertilizer consistency ("even application") across the width of the implement, each hose is preferably the same length. This can result in several hundred feet of hose being routed from the fertilizer tank, which is typically towed behind the implement, to the working tools.

It has been generally desirable to hold the hoses in place, i.e., attach or otherwise secure them to the implement frame itself. In the past, this has been accomplished by using nylon or plastic locking cable straps ("cable ties"). Specifically, at various points along the length of the hoses, a cable tie is wrapped around a frame member of the implement as well as the hose, and cinched tight. The cable ties are typically large enough to allow multiple hoses to be bundled together and held in place as a single unit. This conventional approach works reasonably well when first assembling the fertilizer implement; however, after some usage and with some modest aging, the cable ties degrade and can fail. The ambient temperature changes and the relatively constant exposure to sunlight can cause the cable ties to deteriorate, become brittle, and break. As a result, the hoses can become loose. In some instances, the loose hoses can hang below the implement frame and come into contact with the field surface and the crop stubble thereon as well as pavement during transport. This can result in the hoses pulling further away from the frame and breaking other cable ties or becoming damaged themselves. If the hose is breached or pulled away from either the working tool or the supply tank, the fertilizer could spew from the hose potentially resulting a substantial loss of the fertilizer. Other attempts at improved retention of the hoses have included providing a clamp that clamps down onto the hose. The clamps are effective in retention but are time-consuming to install and limit slack along the length of the hose.

SUMMARY OF THE INVENTION

The present invention is generally directed to a bracket arrangement for securing fertilizer hoses, such as those for carrying anhydrous ammonia, to the frame of a fertilizer applicator or similar implement. The bracket arrangement is made of a corrosion resistant material and is thus resistant to the damage heretofore has been caused by thermal changes, sunlight, and inclement weather. The bracket arrangement is designed to be removably attached to the implement frame to allow flexibility in where along the frame the hoses, or bundles of hoses, are retained.

In accordance with one aspect of the invention, a farm implement includes a frame and a ground engaging tool coupled to the frame. The farm implement further has a bracket arrangement that is mounted to the frame and a hose arrangement for passing fluid from a fluid source to the ground engaging tool. A length of the hose is retained by the bracket.

In accordance with another aspect of the invention, a bracket for use with a farm implement having a hose arrangement for delivering fluid from a fluid source to a plurality of ground engaging tools is provided. The bracket includes an elongated and generally planar body and a frame mounting edge formed along a first length of the body. An eyelet is formed in the planar body and is configured to pass a length of the hose arrangement and restrict movement of the hose arrangement in a direction orthogonal to its length.

According to a further aspect of the invention, a farm implement includes a frame having a plurality of interconnected framing members, a plurality of ground engaging tools coupled to the frame, a plurality of hoses for passing anhydrous ammonia to the plurality of grounding engaging tools, and a plurality of brackets coupled to selected ones of the framing members. Each bracket has an elongated and generally planar body and an eyelet formed in the planar body. The eyelet passes a length of hose and restrict movement of the hose in a direction orthogonal to its length.

Other objects, features, aspects, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

In the drawings.

DETAILED DESCRIPTION

Figure 1:
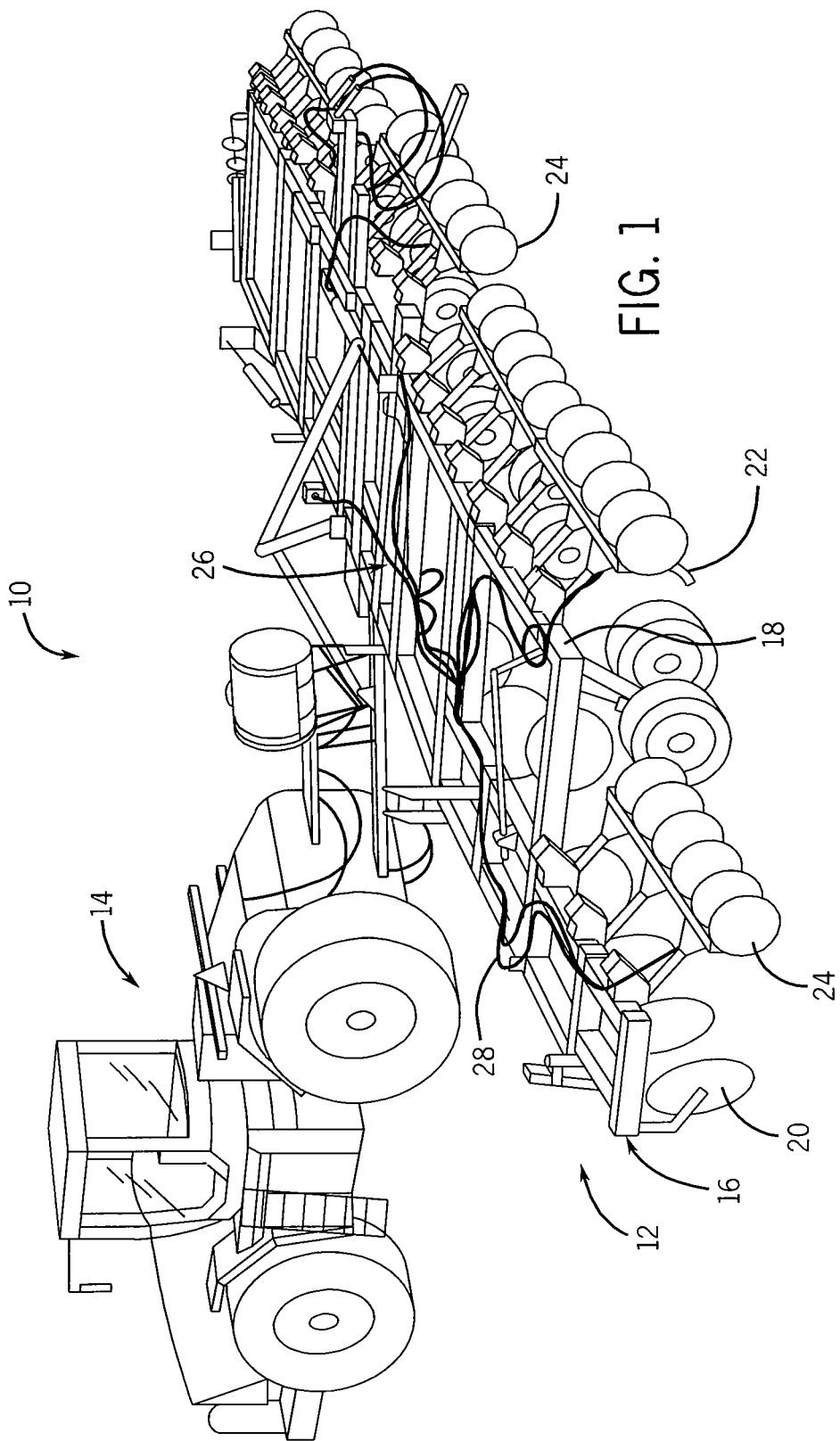
FIG. 1 is an isometric view of a farming system having a fertilizer applicator.

Turning now to FIG. 1, the present invention will be described with respect to a farming system 10 having a fertilizer applicator 12 that is hitched to a tractor 14. It is understood however the present invention could be used with other types of farming or construction implements and that other types of towing vehicles could be used to tow the implement. The fertilizer applicator 12 generally consists of a frame 16 formed by a series of interconnected, i.e., welded, frame members 18, to which one or more types of working tools are mounted. In the illustrated embodiment, the working tools include coulters 20, knives 22, and closing dics or disc sealers 24. As known in the art, the working tools are designed to manage crop residue and apply fertilizer.

In addition to managing crop residue, preparing the seed bed commonly includes adding plant food and other nutrients to the soil. In this regard, the fertilizer applicator 12 includes a hose arrangement 26 that consists of a number of preferably equal-length hoses 28 extending from a fertilizer source, which is not shown but is typically towed behind the fertilizer applicator 12, to respective ones of the working tools. In the illustrated embodiment, the outlet (not shown) of each hose 28 sits generally adjacent a respective knife 22 so that fertilizer is deposited into the soil as the knives 22 cut through the soil and the crop residue.

Figure 2:
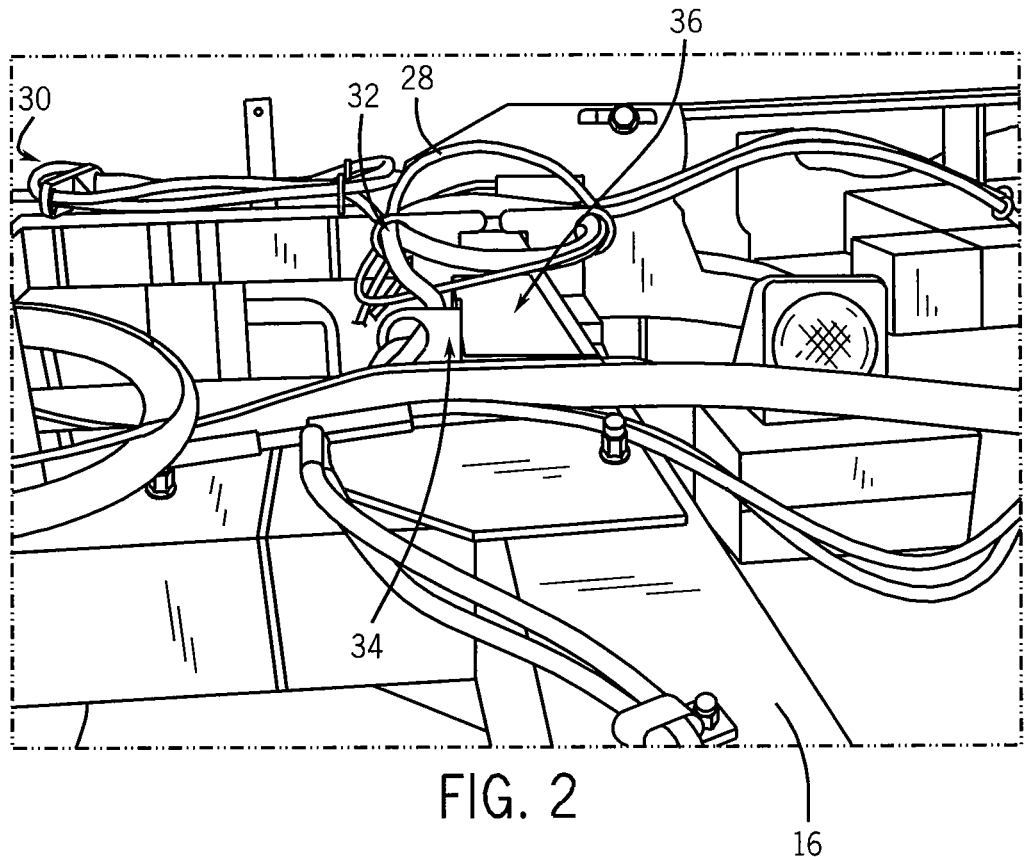
FIGS. 2 and 3 are enlarged views of portions of the fertilizer applicator illustrating the routing of fertilizer hoses using a bracket arrangement according to one embodiment of the invention.
Figure 3:
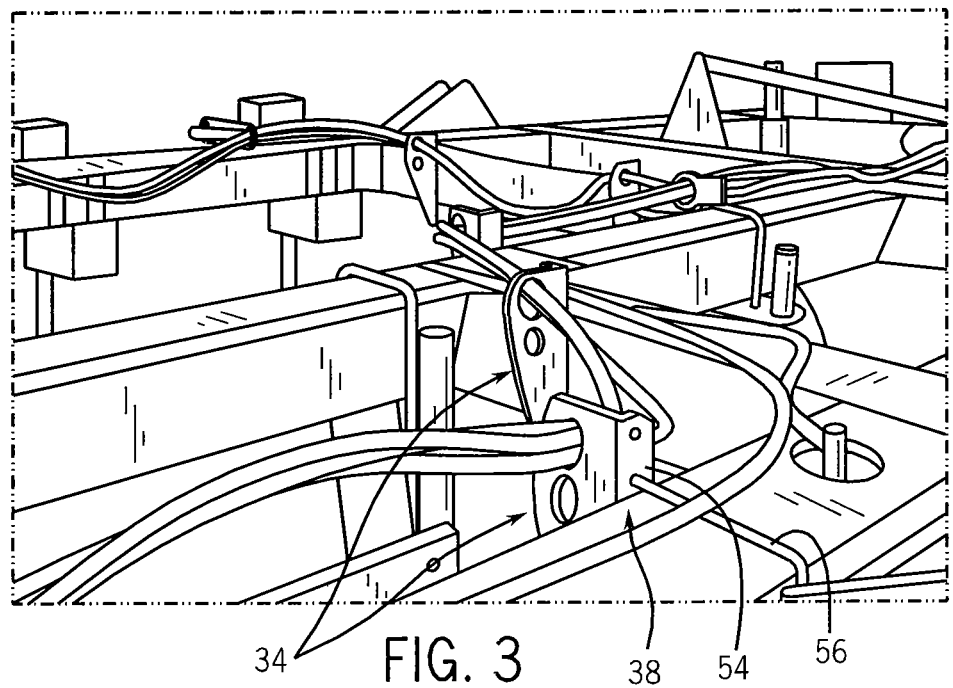

With additional reference to FIGS. 2-6 a bracket arrangement 30 is used to secure the hoses 28 to the frame 16. In one preferred embodiment the bracket arrangement 30 includes two different types of brackets: a coiling bracket 32 and a pass-through bracket 34. While the coiling bracket 32 does allow for pass-through of hoses, its principal purpose is for coiling of the hoses to remove slack in the hoses. As shown in FIGS. 2 and 3, the various brackets are secured to the frame members 18 at various points to provide efficient bundling and routing of the hoses 28 between the knives 22 and the fertilizer source or tank. The brackets can be mounted to the top surface of a frame member 18 as shown generally at 36 in FIG. 2 or to the side surface of a frame member 18 as shown at 38 in FIG. 3.

Figure 4:
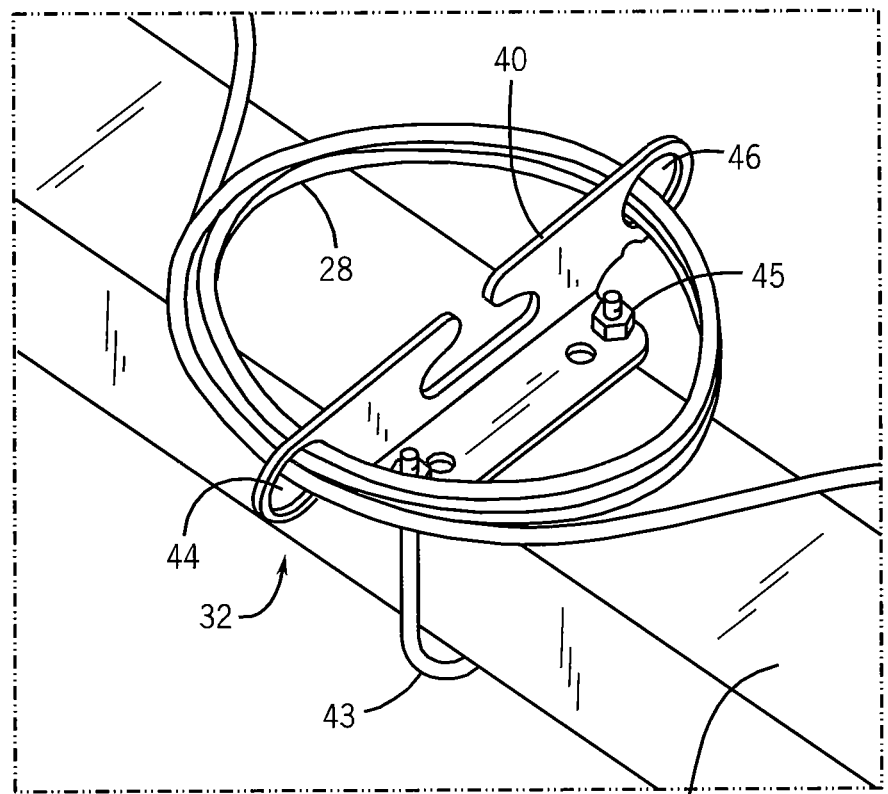
FIG. 4 is a top isometric view of a portion of the fertilizer applicator having a bracket adapted to hold a coiled bundle of fertilizer hoses.
Figure 5:
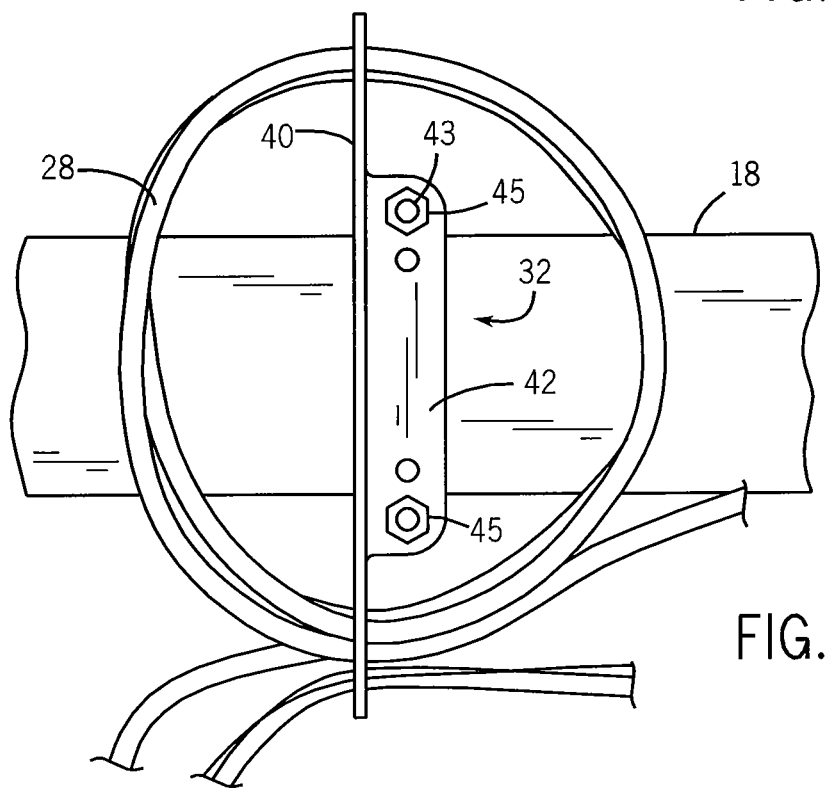
FIG. 5 is a top plan view of the bracket of FIG. 4 shown retaining a coiled bundle of fertilizer hoses.

Turning now to FIGS. 4 and 5, a coiling bracket 32 according to one embodiment of the invention has a generally elongated body 40 with a mounting flange 42, as best seen in FIG. 5, that is held tightly against a frame member 18 by a U-bolt 43 and nuts 45 or other fastening means. The coiling bracket 32 is designed to preferably sit atop the frame member 18 such that its long axis is transverse to the long axis of the frame member 18. This preferred orientation results in a pair of eyelets 44, 46 formed in the body 40 to be outboard of the frame member 18. Each of the eyelets has a diameter sufficient for one or more hoses to be passed therethrough. More importantly, since the coiling bracket 32 has two spaced apart eyelets, the same hose 28 can be coiled around one bracket to effectively reduce the routed length of the hose without physically shortening the length of the hose.

Figure 6:
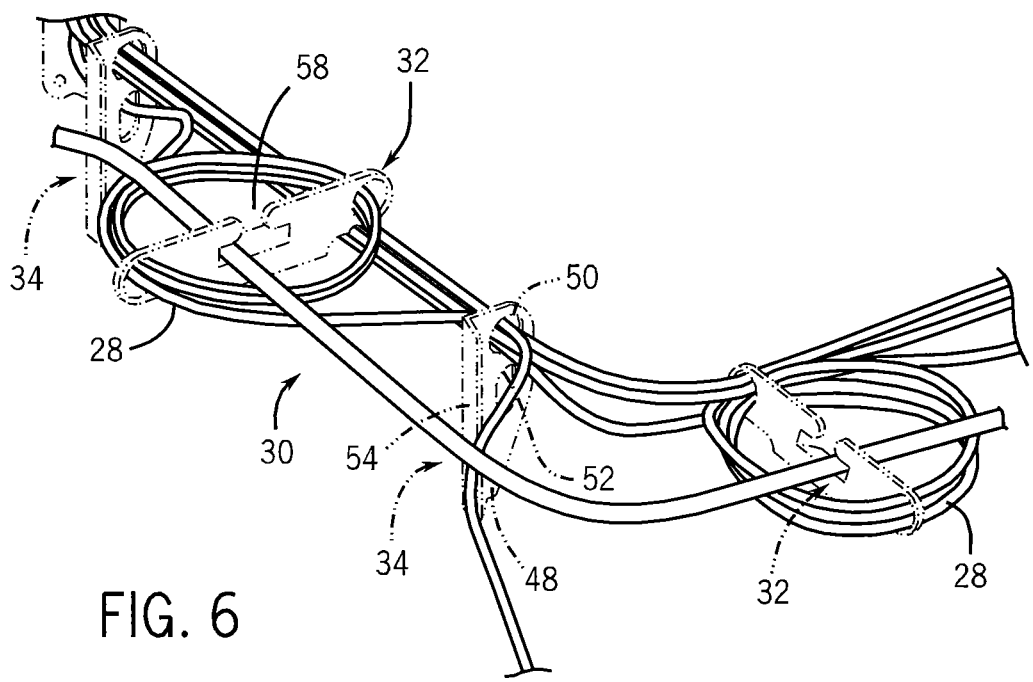
FIG. 6 shows a representative routing of a bundle of fertilizer hoses using several brackets of the present invention with the implement frame hidden for illustrative purposes only.

Turning now to FIG. 6, a pass-through bracket 34 is designed to pass one or more hoses 28. The pass-through bracket 34 also has a generally planar body 48 in which a pair of eyelets 50, 52 are formed. The pass-through bracket 34 also has a mounting flange 54 for securing the pass-through bracket 34 to the frame member 18 such as by lag bolts, or as shown in FIGS. 2 and 3, by a U-clamp or U-bolt 56 or other type of clamping structure. The pass-through bracket 34 are designed to be held against the side of a frame member 18 but could also be mounted to a bottom or top of the frame member 18.

The eyelets described herein are preferably large enough to pass more than one hose, i.e., five or six hoses, as illustrated in FIG. 6. As further shown in FIG. 6, a series of brackets can be used to provide a tight and efficient routing of the hoses. It is also contemplated that the eyelets could be of different diameters and that the brackets could have more or less eyelets than shown in the figures. As also shown in FIG. 6, bracket 32 has a slot 58 formed in an upper portion of the elongated body 40. The slot 58 is sized to receive one or more lengths of hose 28 to provide additional hose routing options.

It will be appreciated that the brackets do not clamp down on the hoses; they simply hold the hoses in a relatively loose, non-clamping manner. In this regard, the brackets provide limited restructured lateral motion of the hoses but do not impede longitudinal movement of the hoses. Moreover, it will be appreciated that the invention could be used for routing of hoses designed to pass fluid other than anhydrous ammonia. For instance, the hoses could be used for passing liquid as well as particulate matter, such as granular fertilizer and seed.

Many changes and modifications could be made to the invention without departing from the spirit thereof. The scope of these changes will become apparent from the appended claims.

The invention claimed is:

1. A bracket for use with a farm implement having a hose arrangement including a plurality of hoses for delivering fluid from a fluid source to a plurality of ground engaging tools, the bracket comprising:
    an elongated and generally planar body, the planar body including first and second ends;
    a frame mounting edge formed along a first length of the body and a second edge formed along a second length of the body;
    a first eyelet formed in the planar body at the first end thereof, the first eyelet configured to loosely pass a length of a first hose the hose arrangement and restrict movement of the first hose of the hose arrangement in a direction orthogonal to its length;
    a second eyelet formed in the planar body at the second end thereof, the second eyelet configured to loosely pass a different length of the first hose of the hose arrangement; and
    a slot formed in the second edge of the body, the slot adapted to loosely pass a length of a second hose of the hose arrangement.

2. The bracket of claim 1 wherein the first eyelet and the second eyelet are outboard of the frame mounting edge.

3. The bracket of claim 1 wherein the slot is positioned between the first and the second eyelets.

4. The bracket of claim 3 wherein the slot is inboard of the frame mounting edge.

5. The bracket of claim 2 wherein the first eyelet and the second eyelet have substantially the same diameter.

6. The bracket of claim 2 wherein the first eyelet and the second eyelet have different diameters.

7. The bracket of claim 6 further wherein the slot has a different diameter than the first and the second eyelets.

8. The bracket of claim 1 further comprising a clamp for holding the bracket mounting edge against a frame member of the farm implement.

9. The bracket of claim 8 wherein the clamp is a U-clamp.

10. The bracket of claim 8 further comprising a mounting flange extending from the frame mounting edge along a plane orthogonal to the planar body.

11. A farm implement comprising:
- a frame having a plurality of interconnected framing members;
- a plurality of ground engaging tools coupled to the frame;
- a plurality of hoses for passing anhydrous ammonia to the plurality of grounding engaging tools; and
- a plurality of brackets coupled to selected ones of the framing members, each bracket having:
  - an elongated and generally planar body having first and second ends, and a first and second edges;
  - a first eyelet formed at the first end of the planar body, the first eyelet configured to loosely pass a first length of hose and restrict movement of the first length of hose in a direction orthogonal to its length;
  - a second eyelet formed at the second end of the planar body, the second eyelet configured to loosely pass a second length of hose and restrict movement of the second length of hose in a direction orthogonal to its length; and
  - a slot formed in one of the first and second edges of the body, the slot adapted to loosely pass a third length of hose and restrict movement of the third length of hose in a direction orthogonal to its length.

12. The farm implement of claim 11 wherein each bracket includes a clamp for securing the bracket to a framing member, and wherein each bracket is formed of corrosion-resistant material.

* * * * *